United States Patent
Niu et al.

(10) Patent No.: US 7,317,925 B2
(45) Date of Patent: Jan. 8, 2008

(54) METHOD AND APPARATUS FOR DETERMINING THE LOCATION OF A NODE IN A WIRELESS SYSTEM

(75) Inventors: Feng Niu, Weston, FL (US); Jian Huang, Coral Springs, FL (US); Spyros Kyperountas, Coral Springs, FL (US)

(73) Assignee: Motorola, Inc., Schaumburg, IL (US)

( * ) Notice: Subject to any disclaimer, the term of this patent is extended or adjusted under 35 U.S.C. 154(b) by 15 days.

(21) Appl. No.: 11/188,908

(22) Filed: Jul. 25, 2005

(65) Prior Publication Data
US 2007/0021124 A1    Jan. 25, 2007

(51) Int. Cl.
*H04Q 7/20* (2006.01)
*H04M 3/00* (2006.01)

(52) U.S. Cl. .............. 455/456.1; 455/422.1; 455/418; 455/419

(58) Field of Classification Search ........... 455/422.1, 455/418, 419, 456.1
See application file for complete search history.

(56) References Cited

U.S. PATENT DOCUMENTS

| 5,898,367 A | 4/1999 | Berube |
| 6,246,861 B1* | 6/2001 | Messier et al. ............ 455/12.1 |
| 6,996,403 B2 | 2/2006 | Shi et al. |
| 2006/0181458 A1* | 8/2006 | Niu et al. .................. 342/463 |
| 2006/0221864 A1* | 10/2006 | Niu et al. .................. 370/255 |

OTHER PUBLICATIONS

Nirupama Bulusu, *Self-Configuring Localization Systems*, Dissertation for University of California, Los Angeles, pp. 1-161, 2002.

* cited by examiner

*Primary Examiner*—George Eng
*Assistant Examiner*—Wesley Kim

(57) ABSTRACT

A location technique is utilized within a wireless communication system where power measurements from various nodes are weighted to determine a node's location. An iterative location process is executed where as more and more nodes are heard from, a node will re-locate itself in order to improve location accuracy.

8 Claims, 4 Drawing Sheets

100

METHOD AND APPARATUS FOR DETERMINING THE LOCATION OF A NODE IN A WIRELESS SYSTEM

FIELD OF THE INVENTION

The present invention relates generally to radiolocation and in particular, to a method and apparatus for determining the location of a node within a wireless communication system.

BACKGROUND OF THE INVENTION

A variety of systems have been proposed that call for the ability to determine the location of an object within a wireless communication system. For example, in asset control, it is desirable to know the locations of objects (e.g., laptop computers, cell phones, . . . , etc.) within the confines of an office building. Prior-art wireless location techniques run the gamut from space-consuming, expensive circuitry that provides very accurate location estimates, to inexpensive, non-space-consuming circuitry that provides very gross location estimates. As is evident, there typically exists a tradeoff between accurate location techniques that are space-consuming and expensive to implement, and less expensive non-space consuming techniques that provide less accurate location estimates. It would be beneficial to improve on a less-expensive approach so that a more accurate determination of location can be made with very little added circuitry. Therefore a need exists for a method and apparatus for determining the location of an object within a wireless communication system that is relatively inexpensive, yet provides accurate location estimates.

DETAILED DESCRIPTION OF THE DRAWINGS

In order to address the above-mentioned need, a method and apparatus for determining the location of an object within a wireless communication system is provided herein. During operation, a location technique is utilized where power measurements from various nodes are used to determine weight factors and in turn to determine a node's location. An iterative location process is executed where as more and more nodes are heard from, a node will re-estimate its location to improve location accuracy.

The present invention encompasses a method for determining a location of a node in a wireless communication system. The method comprises the steps of receiving a first plurality of over-the-air signals from a first plurality of nodes, the first plurality of over-the-air signals each containing a location. A first plurality of weighting factors are calculated based on transmit and receive powers of the first plurality of over-the-air signals. Finally, a location is calculated on the first plurality of weighting factors and the locations.

The present invention additionally encompasses an apparatus comprising a receiver receiving a first plurality of over-the-air signals from a first plurality of nodes, the first plurality of over-the-air signals each containing a location. The apparatus additionally comprises logic circuitry calculating a first plurality of weighting factors based on transmit and receive powers of the first plurality of over-the-air signals and calculating a location on the first plurality of weighting factors and the locations.

Figure 1:
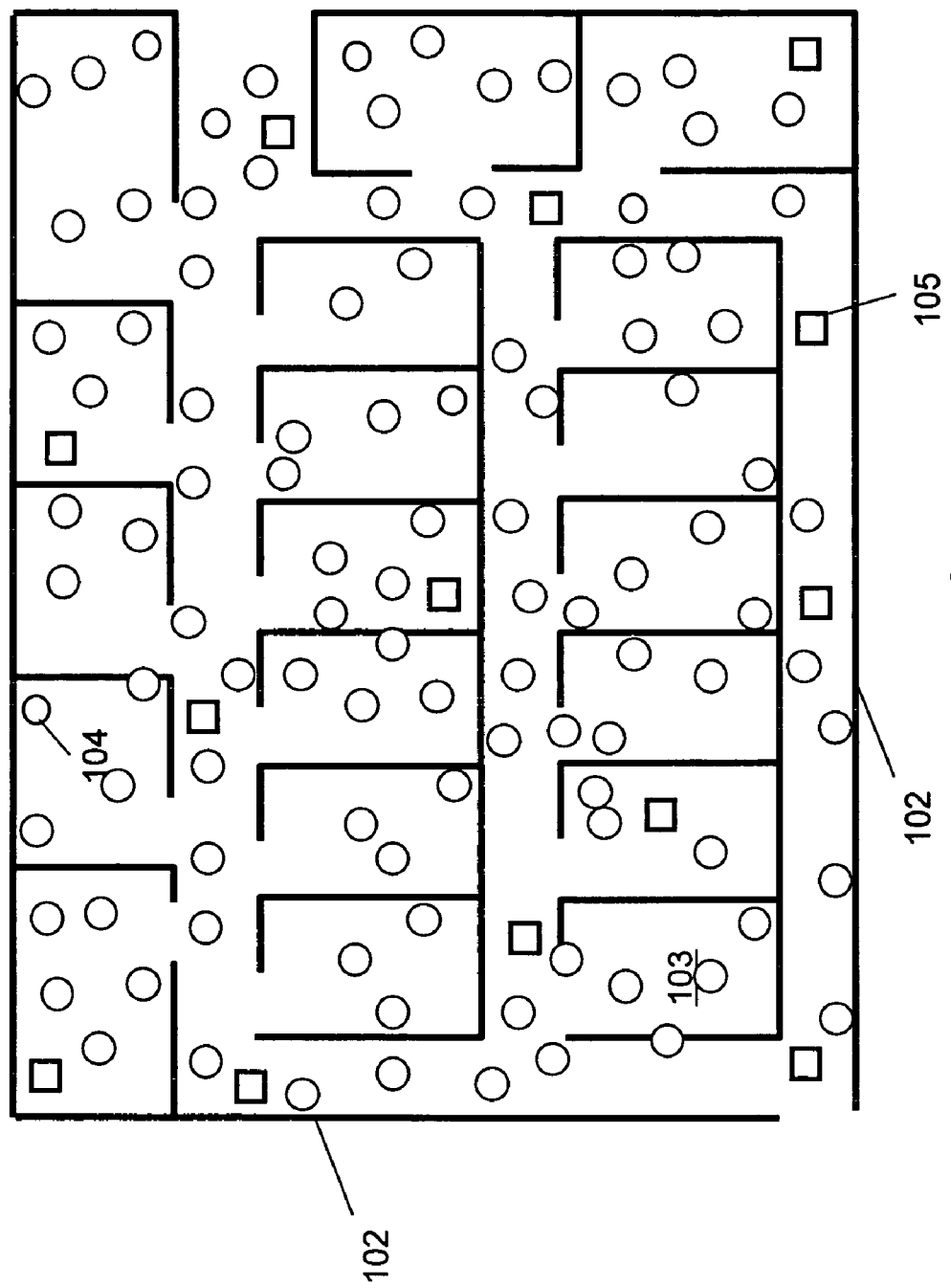
FIG. 1 Illustrates a typical floor plan of an office building in which are located a number of wireless devices involved in determining each other's location.

Turning now to the drawings, wherein like numerals designate like components, FIG. 1 is a block diagram of communication system 100 deployed over a floor plan of an interior of an office building. Communication system 100 comprises a number of wireless devices 104-105 involved in determining a particular node's location. The office building comprises perimeter wall 102 that encloses a plurality of offices 103 (only one labeled).

Circular objects, or nodes 104 (only one labeled) represent wireless devices, the locations of which are unknown and to be determined. Because the locations of nodes 104 are unknown, these nodes 104 are referred to as "blindfolded" nodes or simply "blind" nodes. Blindfolded nodes 104 can include, for example, transceiver security tags attached to valuable assets such as lap top computers, or be embedded in wireless communication devices including cellular telephones. Rectangular objects 105 (only one labeled) represent reference nodes. The locations of nodes 105 are known, or can be easily and accurately determined to within some measurement accuracy (e.g., via physical measurement or via GPS).

It should be noted that although FIG. 1 shows nodes 104-105 existing within a two-dimensional space, one of ordinary skill in the art will recognize that nodes 104-105 may be located in other environments, including 3-dimensional spaces. For example, nodes 104 may comprise golf carts equipped with wireless transceivers located on a golf course. In a similar manner, nodes 104 may comprise inventory located within a multi-level warehouse. Irrespective of the environment where nodes 104 operate, reference nodes 105 are dispersed in known locations to assist in locating blindfolded nodes 104. More particularly, a location technique is utilized where a blindfolded node determines a received power for all reference nodes 105. From the received power, and the known location of reference nodes 105, an initial estimation is made of the location of each blindfolded node 104 based on a mathematical weighting of the received powers. The now-located blindfolded nodes will broadcast their initial locations to be used by other blindfolded nodes 104 in radiolocation. More particularly, after a blindfolded node has been originally located using reference nodes 105, the blindfolded node will again attempt to locate itself, only this time the location estimate will utilize power measurements from located blindfolded nodes 104 that are broadcasting their locations.

Figure 2:
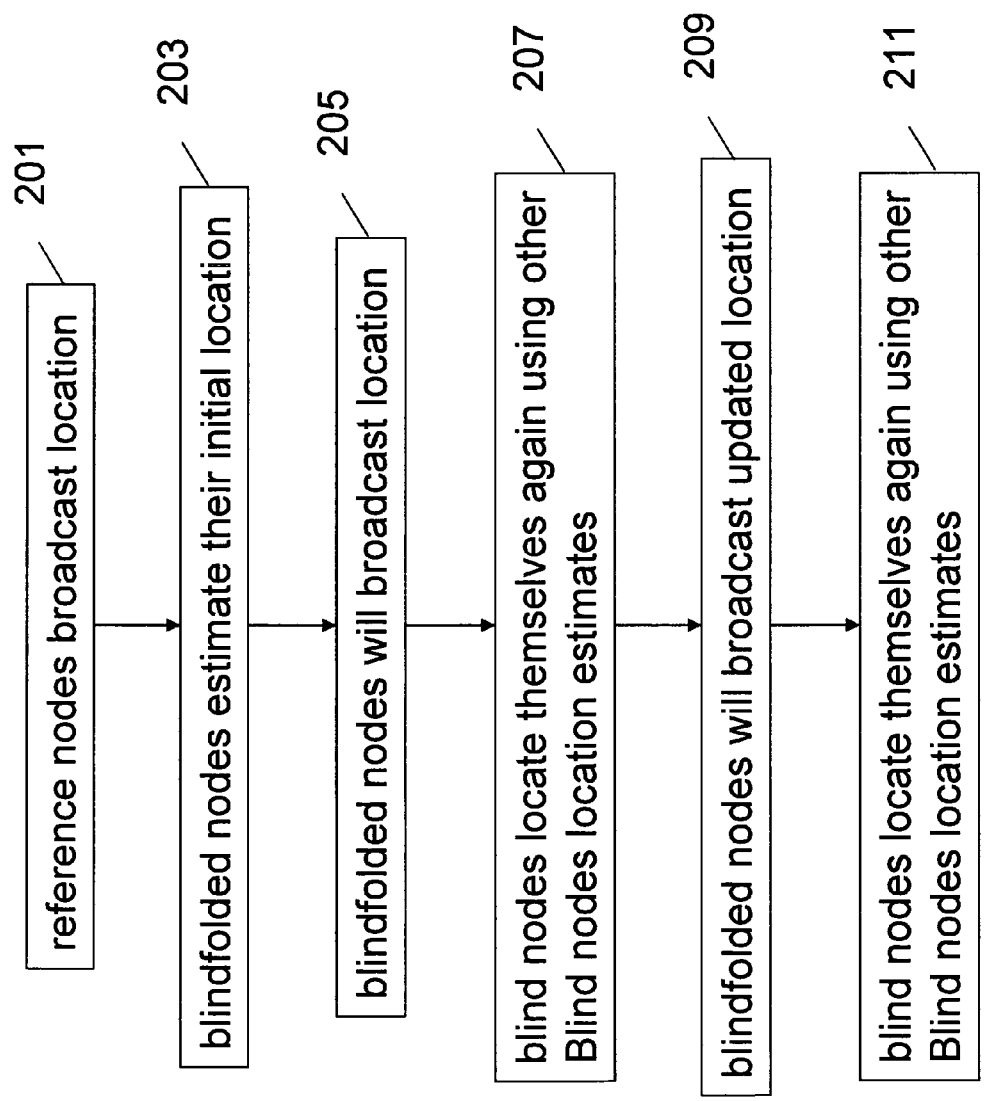
FIG. 2 is a flow chart showing operation of the communication system in FIG. 1.

FIG. 2 is a flow chart showing operation of communication system 100. The logic flow begins at step 201 with each reference node 105 broadcasting its location. During the broadcasting, if transmit power is different for different reference nodes 105, each reference node will also broadcast its transmit power info in addition to the location info. This type of broadcast can be integrated with other communications necessary in establishing and maintaining a wireless network. At step 203 blindfolded nodes 104 estimate their initial location from the following formula:

$$\hat{x}_k = \frac{\sum_j \beta_{k,j} x_j}{\sum_j \beta_{k,j}}, k = 1,2,3, \ldots, Nb \quad (1)$$

where $$\beta_{k,j} = \left(\frac{P_{r,k,j}}{P_{t,j}}\right)^{1/n1}, j = 1,2,3, \ldots, Nr \quad (1a)$$

k—index for blind nodes wishing to locate themselves,
Nb—number of blind nodes in the system,
Nr—number of reference nodes in the system,
$x_j$ is the location of node j; and
j—index for reference nodes.

As is evident, weighting factors are based on a ratio of received power to transmit power. Additionally, in equation 1, n1 is a parameter adjustable to optimize location estimation, preferably in the range of n/2 and 3n/2, where n is the path loss exponent assuming the following path loss model, $$PL(\text{in dB}) = PL_0(\text{in dB}) + 10n \log(r) + \epsilon, \quad (2)$$

$$PL(\text{in dB}) = -10 \log_{10}(\beta). \quad (2a)$$

Also, n1 may be optimized using such other methods as Artificial Neural Network (ANN) to learn from past experience and thus improve the system performance over time.

In equation (2), r is the distance between the two nodes. If n is node-specific, n1 will also be node-specific. In equation (1), β is the inverse of the n1-th root of the path loss and increases with the decrease of the distance between the blind node and the reference node, and thus the closer reference nodes will have greater weights. When n1 approaches infinity, β approaches 1 and all reference nodes are equally weighted. When the path loss model and/or n is unknown, n1 will be taken preferably in the range from 1 to 7, more preferably in the range of 2 to 5. For fast location estimation, n1=1 may be used. $P_{r,k,j}$ is the received power at the kth node for the transmission initiated at the jth node. $P_{t,j}$ is the transmit power from jth reference node. If all the nodes transmit at the same power level, the transmit power is a known constant otherwise the information of the transmit power should be sent by each node when it transmits from time to time if there is a change in transmit power. It should be noted that while equation (1) is one-dimensional, it may be applied to multiple dimensions (e.g., y and z coordinates) for 2D and 3D cases.

Continuing, at step 205 each blindfolded node will broadcast to its neighbors its initial estimated location as given in (1) (with similar equations for y and z). If transmit power is different for different nodes, each node will also broadcast its transmit power info in addition to the location info. This type of broadcast can be integrated with other communications necessary in establishing and maintaining a wireless network.

At step 207 all blind nodes 104 in communication range of other blind nodes will locate themselves again using location estimates from other blind nodes. In particular the blind nodes will perform the following location estimation, $$\hat{x}_i = \frac{\sum_j \beta_{i,j} x_j + \sum_k \beta_{i,k} \hat{x}_k}{\sum_j \beta_{i,j} + \sum_k \beta_{i,k}}, \quad (3)$$

where i=1, 2, 3, . . . , Nb (index for blind nodes), $$\beta_{i,j} = \left(\frac{P_{r,k,j}}{P_{t,j}}\right)^{1/n1}, \beta_{i,k} = \left(\frac{P_{r,i,k}}{P_{t,k}}\right)^{1/n1}, \quad (3a)$$

i, k—index for blind nodes,
j—index for reference nodes, and
n1 is a parameter adjustable to optimize location estimation as discussed above.

At step 209 each blind node with location estimation from the equation (3) (and corresponding ones for other coordinates) will broadcast to its neighbors its updated estimated location. If transmit power is different for different nodes, each node will also broadcast its transmit power info in addition to the location info. This type of broadcast can be integrated with other communications necessary in establishing and maintaining a wireless network. Finally, at step 211, each blind node 104 will again locate itself using location estimates from other blind nodes 104 that have located themselves using equation (3).

It should be noted that the steps of the above logic flow are performed by blind nodes only when they have appropriately located themselves. If, for some reason, a blind node cannot locate itself using a particular equation, then the blind node will not broadcast its location. For example, if a blind node is not in communication with other blind nodes, it will be unable to locate itself using equation (3). Because of this, the blind node will not be capable of executing steps 207 and 209.

Figure 3:
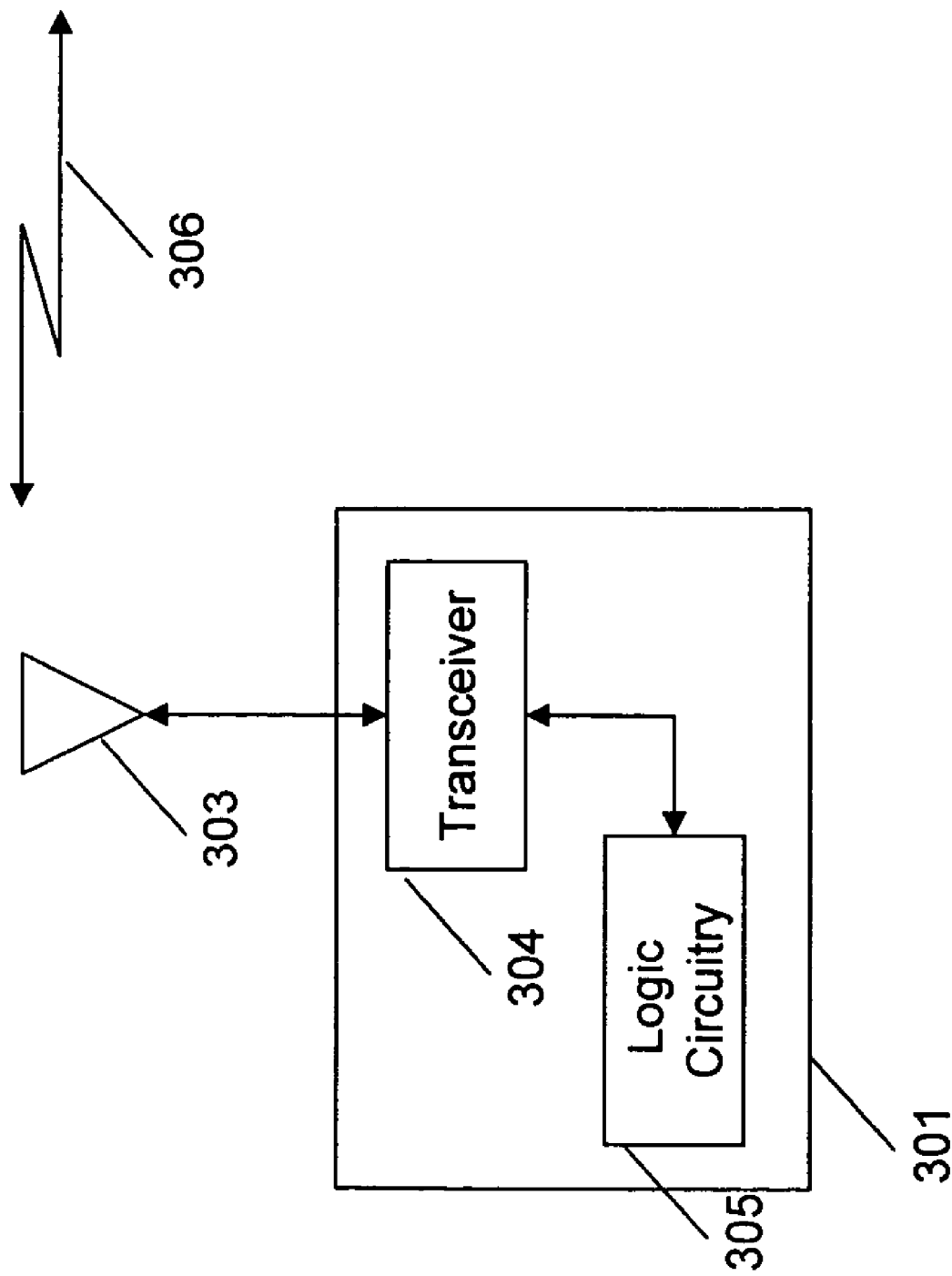
FIG. 3 is a block diagram of a node equipped to determine a location.

FIG. 3 is a block diagram of a node 301 equipped to determine its location via power measurements. In a preferred embodiment of the present invention blindfolded node 301 comprises antenna 303 coupled to transmitter/receiver (transceiver) 304, in turn, coupled to logic circuitry 305. Although various forms for antenna 303, transceiver 304, and logic circuitry 305 are envisioned, in a preferred embodiment of the present invention blindfolded node 301 is formed from a Freescale Inc. MC13192 transceiver 304 coupled to a Motorola HC08 8-bit processor 305.

When blindfolded node 301 wishes to determine its location, it receives over-the-air communication signal 306 transmitted from all nodes 104 and 105. Communication signal 306, received from nodes 104 and 105 comprises a physical location of the node (e.g., (x,y,z) components). Once signal 306 is received by transceiver 304, the power of the received signal is determined by logic circuitry 305. Logic circuitry 305 then estimates its location via equations (1) or (3). More particularly, if location estimates are not received from blindfolded nodes, then only equation (1) is used; otherwise equation (3) is used. As discussed above, logic circuitry 305 may perform several location estimates when locations from other nodes are received. After each location estimate, logic circuitry 305 will instruct transceiver 304 to broadcast its location estimate. Additionally, if transmit power may vary among the nodes, each node will also broadcast its transmit power information in addition to the location information.

Figure 4:
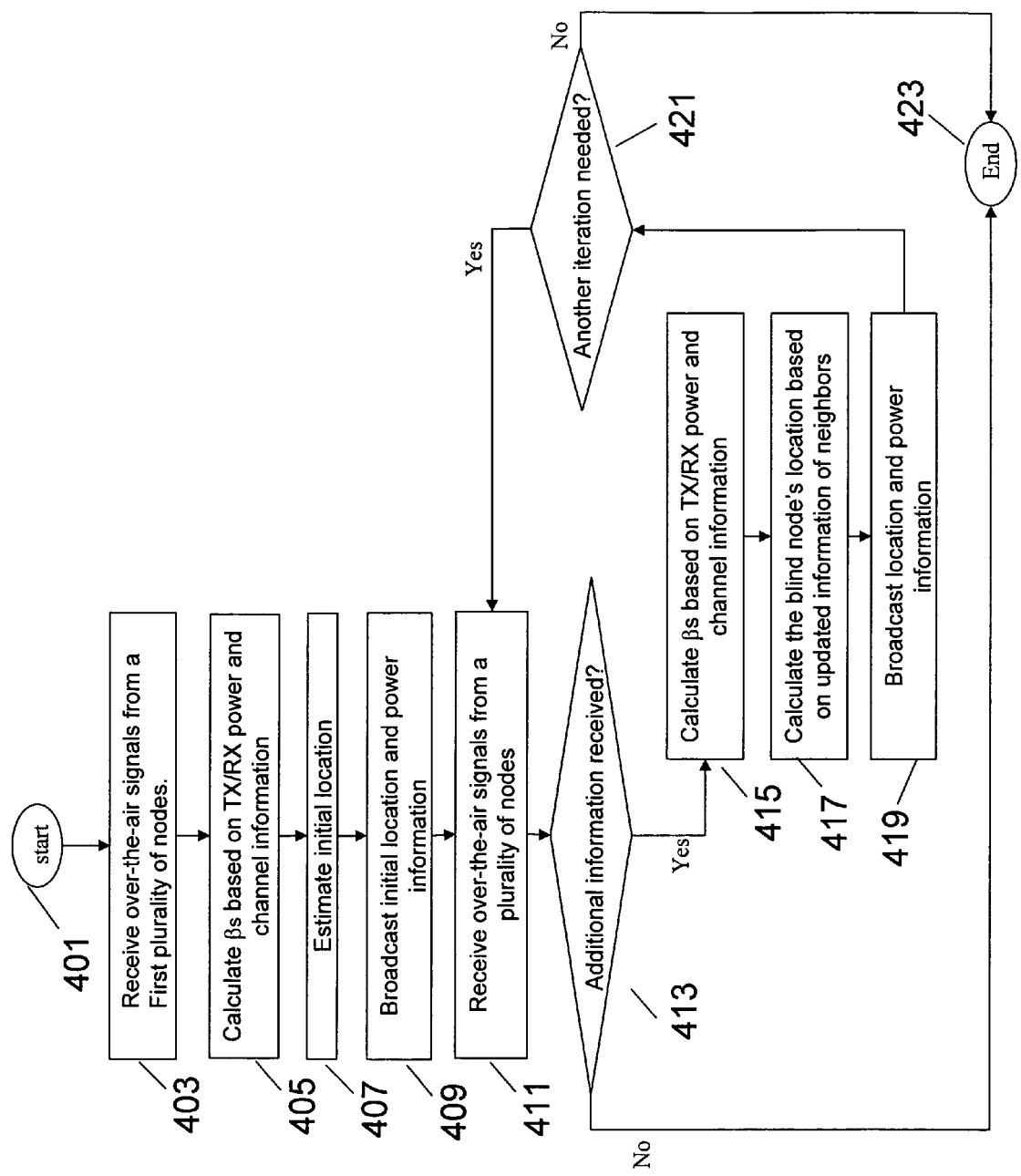
FIG. 4 is a flow chart showing operation of the node of FIG. 3.

FIG. 4 is a flow chart showing operation of the blindfolded node of FIG. 3 during location estimation. The logic flow begins at step 401. At step 403 transceiver 304 receives a first plurality of over-the-air signals from a first plurality of nodes 104-105 within communication range. As discussed above, these signals may contain transmit power information, and are preferably transmitted from reference nodes, the locations of which are known. At step 405, a first plurality of weighting factors β are calculated based on the transmitted and received power. These are calculated by logic circuitry 305 using the equation (1a). Note that only those βs for the links to the reference nodes 105 are needed at this step. At step 407 an initial location estimate is made by logic circuitry 305. As discussed above, the location estimate is made based on a weighted sum of the locations of the neighboring reference nodes 105. At step 409, the initial location information, plus transmit power information if necessary, is broadcasted. From step 411 to step 421, iterative location estimation procedure is carried out based on two conditions at steps 413 and 421. At step 413, transceiver 304 receives a second plurality of over-the-air signals from a plurality of nodes 104-105 within communication range. At step 413, a determination is made by logic circuitry 305 whether or not additional location information has been received from nodes 104-105 that was transmitted via a second plurality of over-the-air signals from a second plurality of nodes. The additional location information may be from reference nodes, or may be from blindfolded nodes that have updated their location. If no additional location information is received, the iterative location procedure is terminated. If there is additional location information received, the logic flow continues to step 415. At step 415, a second plurality of weighting factors β based on the transmitted and received power are calculated by logic circuitry 305 using the equation (1a). Note that only those βs for the links to the nodes 104-105 with location information (known or estimated) are needed. At step 417, an updated location estimate is made by logic circuitry 305. The location estimate is made based on a weighted sum of the locations of the neighboring nodes 104-105. Additionally, if only reference node transmissions are received, equation (2) will be used by logic circuitry 305, otherwise equation (3) will be used. At step 419, logic circuitry 305 instructs transceiver 304 to broadcast the location estimate and the logic flow continues to step 421.

At step 421 a determination is made by logic circuitry 305 whether or not additional iteration is needed. The determination may be based on such factors as the accuracy requirement, time limit for doing location estimation, and resources available to continue the process. Regardless of how the determination is made, if at step 421 it is determined that another iteration is needed, the logic flow returns to step 411 and starts another loop of iteration. If, however, no additional iteration is needed, the process terminates.

While the invention has been particularly shown and described with reference to a particular embodiment, it will be understood by those skilled in the art that various changes in form and details may be made therein without departing from the spirit and scope of the invention. For example, in some cases, it may be desirable to perform radiolocation calculations without using microprocessor resources. One skilled in the art recognizes that a hardware implementation of the invention is readily targeted toward integrated circuit fabrication processes in which logic functions are feasible. Examples of such fabrication processes include UMC or Freescale 90 nanometer CMOS. A hardware implementation is preferably but not necessarily integrated with a transceiver in a system-on-chip (SoC).

What is claimed is:

1. A method for determining a location of a node in a wireless communication system, the method comprising the steps of:

receiving a first plurality of over-the-air signals from a first plurality of nodes, the first plurality of over-the-air signals each containing a location;

calculating a first plurality of weighting factors based on a ratio of received power to transmit power;

calculating a location based on the first plurality of weighting factors and the locations;

receiving a second plurality of over-the-air signals from a second plurality of nodes, the second plurality of over-the-air signals each containing a location;

calculating a second plurality of weighting factors based on transmit and receive powers of the second plurality of over-the-air signals;

calculating an updated location based on the second plurality of weighting factors and the locations within the second plurality of over-the air signals;

wherein the first plurality of nodes comprises a first plurality of reference nodes, the locations of which are known; and wherein the second plurality of nodes comprises reference nodes, the locations of which are known, and blind nodes, the locations of which are estimate;

wherein the step of calculating the first plurality of weighting factors comprises the step of calculating a plurality of values for $$\beta_{k,j} = \left(\frac{P_{r,i,j}}{P_{t,j}}\right)^{1/n1}, j = 1,2,3,\ldots, Nr, \text{ where}$$

k—index for a blind node wishing to locate itself,

Nr—number of reference nodes in the system, j—index for reference nodes, n1 is a parameter adjustable to optimize location estimation, $P_{r,k,j}$ is the received power at the kth node for the transmission initiated at the jth node; and $P_{t,j}$ is the transmit power from jth reference node; and wherein the step of calculating the location comprises the step of calculating $$\hat{x}_k = \frac{\sum_j \beta_{k,j} x_j}{\sum_j \beta_{k,j}}, k = 1,2,3,\ldots, Nb, \text{ where}$$

Nb—number of blind nodes in the system, $x_j$ is the location of node j; and j—index for reference nodes.

2. The method of claim 1 wherein the first plurality of over-the-air signals additionally comprises transmit power information.

3. The method of claim 1 wherein n1 is a parameter adjustable to optimize location estimation, preferably in the range of n/1 and 3n/1, where n is the path loss exponent assuming the following path loss model, $PL$(in dB)=$PL_0$ (in dB)+10$n$ log($r$)+ϵ, $PL$(in dB)=−10log$_{10}$ (β), where $r$ is a distance between the two nodes.

4. The method of claim 1 wherein the second plurality of over-the-air signals additionally comprises transmit power information.

5. The method of claim 1 wherein the step of calculating the second plurality of weighting factors comprises the step of calculating a second plurality of weighting factors that are based on a ratio of received power to transmit power.

6. The method of claim 1 wherein the step of calculating the second plurality of weighting factors comprises the step of calculating a plurality of values for $$\beta_{i,j} = \left(\frac{P_{r,i,j}}{P_{t,j}}\right)^{1/n1} \text{ and } \beta_{i,k} = \left(\frac{P_{r,i,k}}{P_{t,k}}\right)^{1/n1}, \; j = 1,2,3,\ldots, Nr, \text{ where}$$

k—an index for a blind node wishing to locate itself,
Nr—number of reference nodes in the system,
j—index for reference nodes,
n1 is a parameter adjustable to optimize location estimation,
$P_{r,k,j}$ is the received power at the kth node for the transmission initiated at the jth node; and
$P_{t,j}$ is the transmit power from jth reference node.

7. The method of claim 6 wherein n1 is a parameter adjustable to optimize location estimation, preferably in the range of n/1 and 3n/2, where n is the path loss exponent assuming the following path loss model, $$PL(\text{in dB}) = PL_0 \text{ (in dB)} + 10n \log(r) + \epsilon,$$

$$PL(\text{in dB}) = -10\log_{10}(\beta), \text{ where } r \text{ is a distance between the two nodes.}$$

8. The method of claim 6 wherein the step of calculating the updated location comprises the step of calculating $$\hat{x}_i = \frac{\sum_j \beta_{i,j} x_j + \sum_k \beta_{i,k} \hat{x}_k}{\sum_j \beta_{i,j} + \sum_k \beta_{i,k}}, \text{ where}$$

i=1,2, 3, . . . , Nb
k—index for blind nodes,
Nb—number of blind nodes in the system,
$x_j$ is the location of node j; and
j—index for reference nodes.

* * * * *